US009518610B2

United States Patent
Vincent et al.

(10) Patent No.: US 9,518,610 B2
(45) Date of Patent: Dec. 13, 2016

(54) LOAD COUPLING AND METHOD FOR ADJUSTING TORSIONAL NATURAL FREQUENCY OF POWER TRAIN

(71) Applicant: General Electric Company, Schenectady, NY (US)

(72) Inventors: Raymond Andrew Vincent, Fountain Inn, SC (US); Nicholas Simon Graham, Greenville, SC (US); John Herbert Dimmick, Greenville, SC (US); Richard Francis Gutta, Greer, SC (US)

(73) Assignee: General Electric Company, Schenectady, NY (US)

( * ) Notice: Subject to any disclaimer, the term of this patent is extended or adjusted under 35 U.S.C. 154(b) by 828 days.

(21) Appl. No.: 13/934,645

(22) Filed: Jul. 3, 2013

(65) Prior Publication Data

US 2014/0356047 A1    Dec. 4, 2014

Related U.S. Application Data

(60) Provisional application No. 61/828,036, filed on May 28, 2013.

(51) Int. Cl.
*F16F 15/34*  (2006.01)
*F16D 1/033*  (2006.01)
*F16F 15/00*  (2006.01)
*F16C 3/02*  (2006.01)

(52) U.S. Cl.
CPC ................. *F16D 1/033* (2013.01); *F16C 3/02* (2013.01); *F16F 15/00* (2013.01); *F16D 2300/22* (2013.01); *Y10T 403/27* (2015.01)

(58) Field of Classification Search
CPC ........... F16D 1/033; F16D 1/076; F16F 15/10; F16F 15/32; F16F 15/322; F16F 15/34
See application file for complete search history.

(56) References Cited

U.S. PATENT DOCUMENTS

| 4,496,259 A | * | 1/1985 | Foucher | ..................... B61F 5/26 403/14 |
| 4,998,780 A |   | 3/1991 | Eshler et al. | |
| 5,205,189 A | * | 4/1993 | Wesling | .................. F01D 5/027 464/180 |

(Continued)

FOREIGN PATENT DOCUMENTS

| DE | 37 33 338 | * | 4/1989 | .............. B65H 27/00 |
| EP | 0 113 407 | * | 7/1984 | .............. F16F 15/32 |

(Continued)

*Primary Examiner* — Michael P Ferguson
(74) *Attorney, Agent, or Firm* — Dority & Manning, P.A.

(57) ABSTRACT

Load couplings, power trains, and methods for adjusting torsional natural frequencies of power trains are provided. In one embodiment, a load coupling includes a first flange, a second flange, and a shaft extending between the first flange and the second flange. The load coupling further includes an annular ring extending radially outward from one of the first flange, the second flange, or the shaft, the annular ring including a plurality of bore holes defined therein, each of the plurality of bore holes including a first opening. The load coupling further includes a first cap connected within one of the plurality of bore holes proximate the first opening, the first cap deformable such that an interference fit is created with the one of the plurality of bore holes.

12 Claims, 9 Drawing Sheets

(56) References Cited

U.S. PATENT DOCUMENTS

| | | | |
|---|---|---|---|
| 5,299,880 A * | 4/1994 | Bouchard | F02F 7/0073 403/24 |
| 5,540,529 A * | 7/1996 | Jansson | F16B 39/12 403/370 |
| 8,177,487 B2 * | 5/2012 | Koza | F01D 5/027 415/119 |
| 8,319,380 B2 | 11/2012 | Singhal | |
| 9,145,923 B2 * | 9/2015 | Graham | F16D 1/02 |
| 9,272,574 B2 * | 3/2016 | Ebert | B60B 27/0078 |
| 2005/0089385 A1 | 4/2005 | Lin | |
| 2009/0041560 A1 | 2/2009 | Lunden | |
| 2010/0296893 A1 | 11/2010 | Dupiol | |
| 2012/0230798 A1 | 9/2012 | Sterle | |
| 2013/0071180 A1 | 3/2013 | Graham et al. | |
| 2014/0079537 A1 * | 3/2014 | Arnold | F01D 5/027 415/119 |

FOREIGN PATENT DOCUMENTS

| | | |
|---|---|---|
| EP | 0234939 A2 | 9/1987 |
| EP | 0460335 A1 | 12/1991 |
| EP | 0801236 A1 | 10/1997 |

\* cited by examiner

LOAD COUPLING AND METHOD FOR ADJUSTING TORSIONAL NATURAL FREQUENCY OF POWER TRAIN

CROSS REFERENCE TO RELATED APPLICATIONS

The present application claims filing benefit of U.S. Provisional Patent Application Ser. No. 61/828,036 having a filing date of May 28, 2013 and which is incorporated herein by reference in its entirety.

FIELD OF THE INVENTION

The present disclosure relates generally to power trains, and more specifically to methods and apparatus for adjusting torsional natural frequencies of power trains.

BACKGROUND OF THE INVENTION

Power trains are typically mechanical and electrical systems that generate and deliver power. An example of a power train is a turbine and generator coupled by a load coupling. The turbine applies torque to the load coupling which drives the generator that produces electrical power.

Vibrations in the power train are induced by cyclical variations in the torque or other forces applied to or by the power train. If the frequencies of these cyclical variations coincide with the natural frequencies of the power train, the cyclical variations may cause excessive torsional vibrations in the power train.

Power trains are often designed to operate away from their torsional natural frequencies. Despite well intentioned designs, power trains may experience cyclical variations in torque at frequencies at or near the natural frequencies. Under these cyclical variations, the power train may excessively vibrate and be damaged. There is a long felt need for devices and methods to adjust the inertia and natural torsional frequencies of a power train and other rotating bodies.

The turbine and generator in an industrial power train are typically large and heavy devices. A turbine may be an industrial gas turbine or steam turbine, which are large and heavy power generation units. Similarly, the generators may be large generators used by utilities to produce electrical power. Due to their large size and mass, it is difficult to modify the turbines and generators sufficiently to shift the natural frequencies at which they vibrate after they have been installed. There is a long felt need to adjust the inertia and natural torsional frequencies of industrial power trains that does not require substantial changes to the turbines or generators.

Currently known approaches to adjusting the inertial and natural torsional frequencies of such power trains involve the use of additional masses arranged about the load coupling. However, these currently known approaches may in some cases require deformation of the load coupling to retain these masses during operation.

Accordingly, methods and apparatus for adjusting torsional natural frequencies of power trains which do not require deformation of the load coupling are desired in the art. In particular, retention methods and apparatus for masses added to the load coupling that do not require deformation of the load coupling would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a power train. The power train includes a torque producing power source including a rotating connecting flange, and a torque driven power load including a rotating connecting flange. The power train further includes a load coupling. The load coupling includes a first flange adapted to couple to the connecting flange of one of the torque producing power source and the torque driven power load, a second flange adapted to couple to the connecting flange of the other of the torque producing power source and the torque driven power load, and a shaft extending between the first flange and the second flange. The load coupling further includes an annular ring extending radially outward from one of the first flange, the second flange, or the shaft, the annular ring including a plurality of bore holes defined therein, each of the plurality of bore holes including a first opening. The load coupling further includes a first cap connected within one of the plurality of bore holes proximate the first opening, the first cap deformable such that an interference fit is created with the one of the plurality of bore holes.

In another embodiment, the present disclosure is directed to a load coupling for a power train. The load coupling includes a first flange, a second flange, and a shaft extending between the first flange and the second flange. The load coupling further includes an annular ring extending radially outward from one of the first flange, the second flange, or the shaft, the annular ring including a plurality of bore holes defined therein, each of the plurality of bore holes including a first opening. The load coupling further includes a first cap connected within one of the plurality of bore holes proximate the first opening, the first cap deformable such that an interference fit is created with the one of the plurality of bore holes.

In some embodiments, a power train or load coupling according to the present disclosure may further include a second cap connected within the one of the plurality of bore holes proximate a second end, the second cap deformable such that an interference fit is created with the one of the plurality of bore holes.

In some embodiments, a power train or load coupling according to the present disclosure may further include a plug disposed within the one of the plurality of bore holes, the plug contacting the first cap and/or the second cap.

In another embodiment, the present disclosure is directed to a method for adjusting a torsional natural frequency of a power train including a load coupling coupled between a torque producing power source and a torque driven power load. The method includes providing an annular ring extending radially outward from one of a first flange, a second flange, or a shaft of the load coupling, the annular ring including a plurality of bore holes defined therein, each of the plurality of bore holes including a first opening. The method further includes connecting a first cap within one of the plurality of bore holes proximate the first opening, the first cap deformable such that an interference fit is created with the one of the plurality of bore holes. The present disclosure further includes inserting a plug into the one of the plurality of bore holes.

In some embodiments, the method further includes connecting a second cap within one of the plurality of bore holes proximate a second opening, the second cap deformable such that an interference fit is created with the one of the plurality of bore holes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
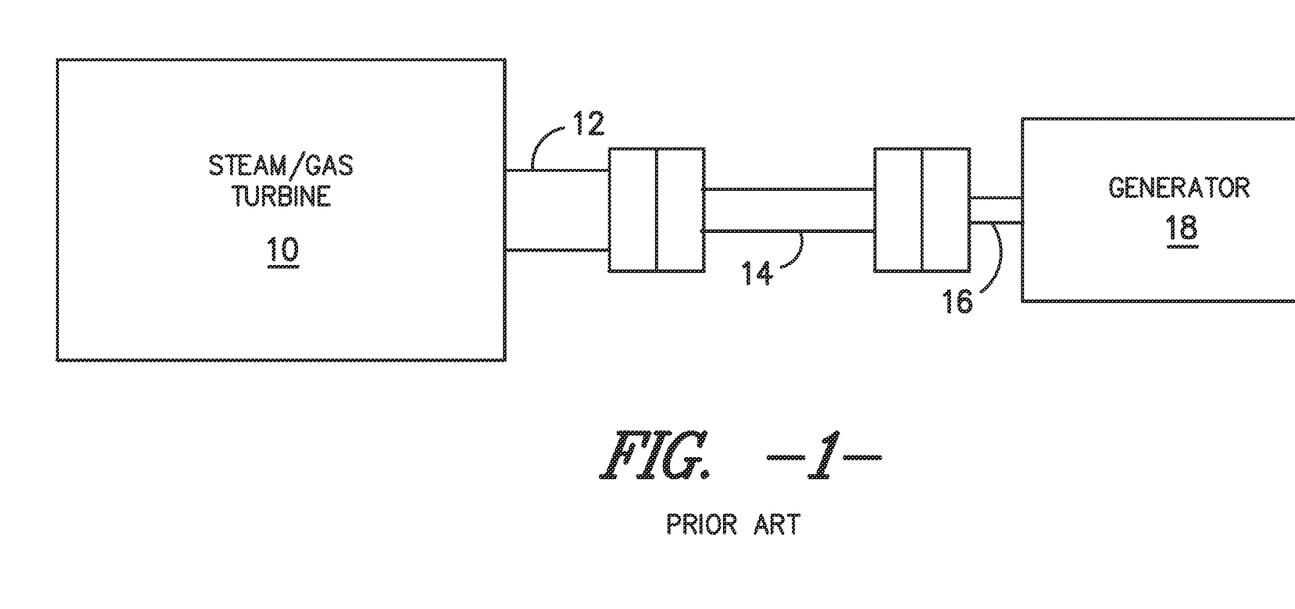
FIG. 1 is a schematic view of one embodiment of a conventional power train.

FIG. 1 is a schematic illustration of a conventional power train having a steam or gas turbine 10 with a rotor shaft 12, which is attached to a first end of a load coupling 14. The opposite end of the load coupling is attached to the rotor shaft 16 of an electrical generator 18.

The power train will be typically designed such that its operating conditions avoid the torsional natural frequencies. For example, the normal operating rotating speed of the rotors and load coupling may be selected to avoid the torsional natural frequencies of the power train. The design requirements of the power train may include margins each centered on a torsional natural frequency. The power train is to be operated at rotational speeds that avoid these margins so as to avoid exciting the torsional natural frequencies.

Despite efforts to design a power train to avoid torsional natural frequencies it may be discovered during testing or other operation of the power train that torsional natural frequencies are excited at normal operating conditions. If one or more of the torsional natural frequencies of the power train are excited during operating conditions or if the power train has insufficient torsional frequency margins, there is a need to modify the torsional frequency of the power train.

The power train has one or more natural frequencies which may be excited by torsional vibrations occurring at or near a torsional natural frequency. The natural frequencies of the power train are dependent on the inertia of the power train. The inertia of the load coupling is a component of the inertia of the power train. Because the inertia of the load coupling affects the natural frequencies of the power train, the natural frequencies of the power train may be adjusted by changing the inertia of the load coupling.

Figure 2:
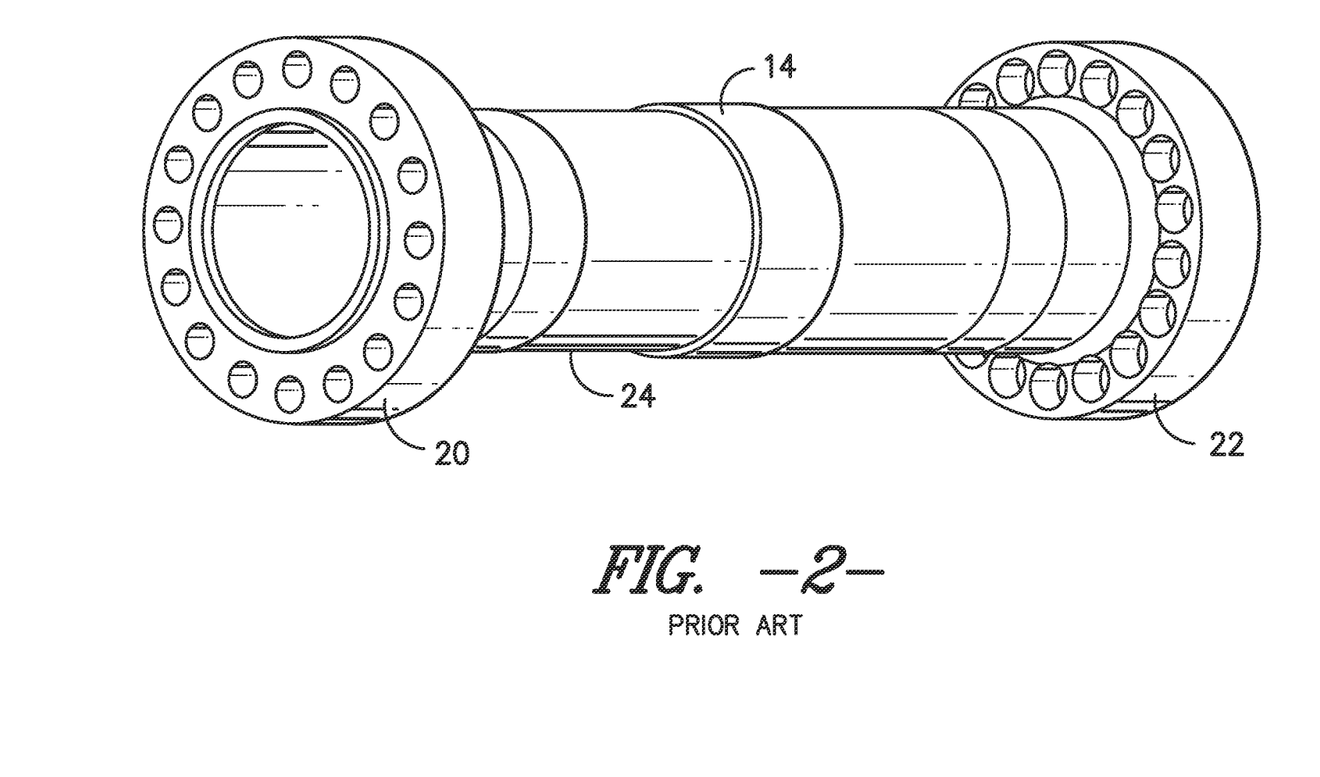
FIG. 2 is a perspective view of one embodiment of a conventional load coupling.

FIG. 2 shows a conventional load coupling 14 having annular flanges 20, 22 at opposite ends of a cylindrical drive shaft 24. The flanges include holes that receive bolts or other fasteners to attach to a mating flange at the end of the rotors of the turbine and generator. The load coupling transfers the torque applied by the rotor for the turbine to drive the rotor for the generator. The conventional load coupling 14 does not offer the ability to adjust the mass or inertia of the load coupling 14 without permanently modifying the load coupling 14, such as through material removal.

Figure 3:
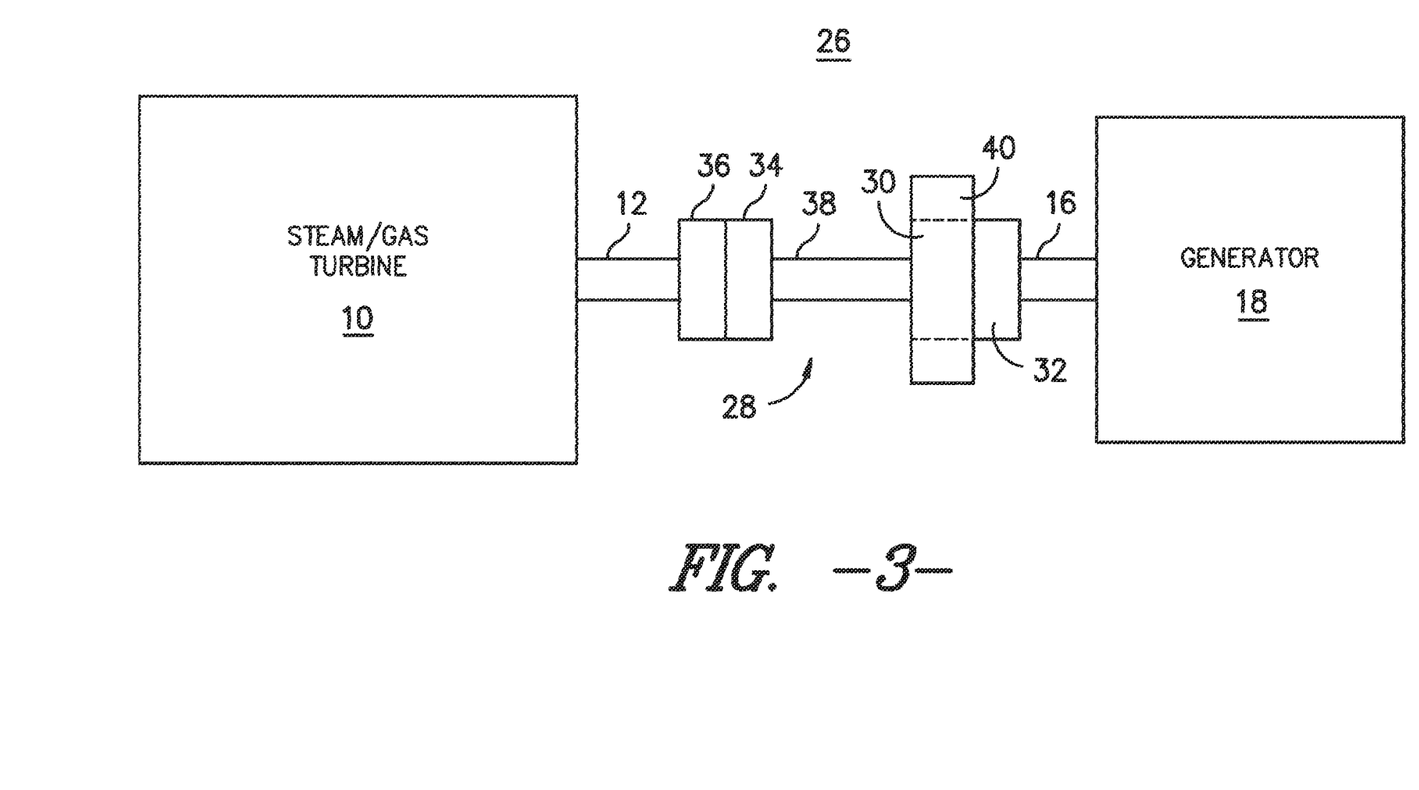
FIG. 3 is a schematic view of a power train in accordance with one embodiment of the present disclosure.

FIG. 3 shows a power train 26 including a torque producing power source, which in exemplary embodiments is a steam or gas turbine 10, having a rotor shaft 12. The power train 26 further includes a torque driven power load, which in exemplary embodiments is an electrical generator 18, having a rotor shaft 16. A load coupling 28 may be coupled to and between the power source and power load. The load coupling 28 may include a first flange 30 that is adapted to couple and thus couples to a rotating connecting flange 32 on the rotor shaft for one of the power source or power load, such as the rotor shaft 16 of the generator 18 as shown. The load coupling 28 may further include a second flange 34 that is adapted to couple and thus couples to a rotating connecting flange 36 on the rotor shaft for the other of the power source or power load, such as the rotor shaft 12 of the turbine 10 as shown.

Figure 4:
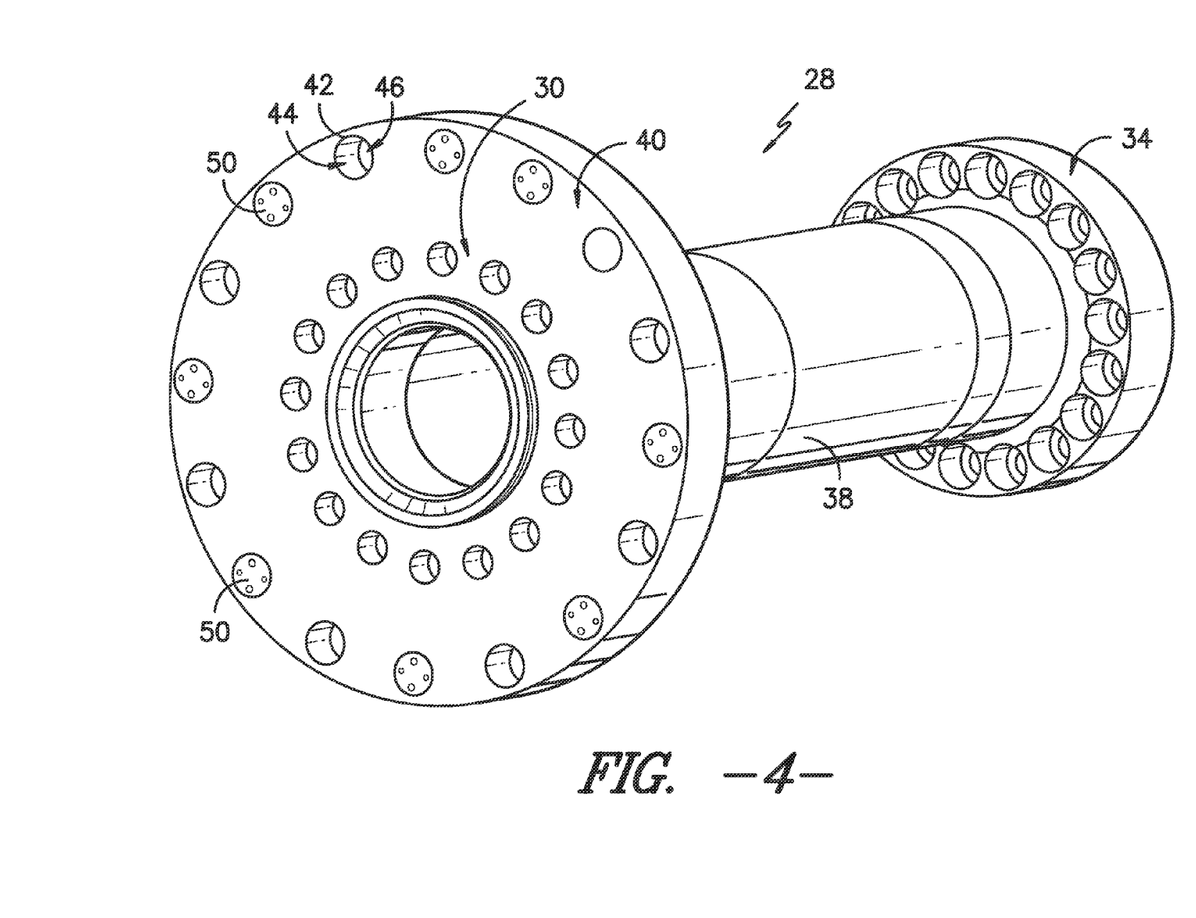
FIG. 4 is a perspective view of a load coupling in accordance with one embodiment of the present disclosure.
Figure 5:
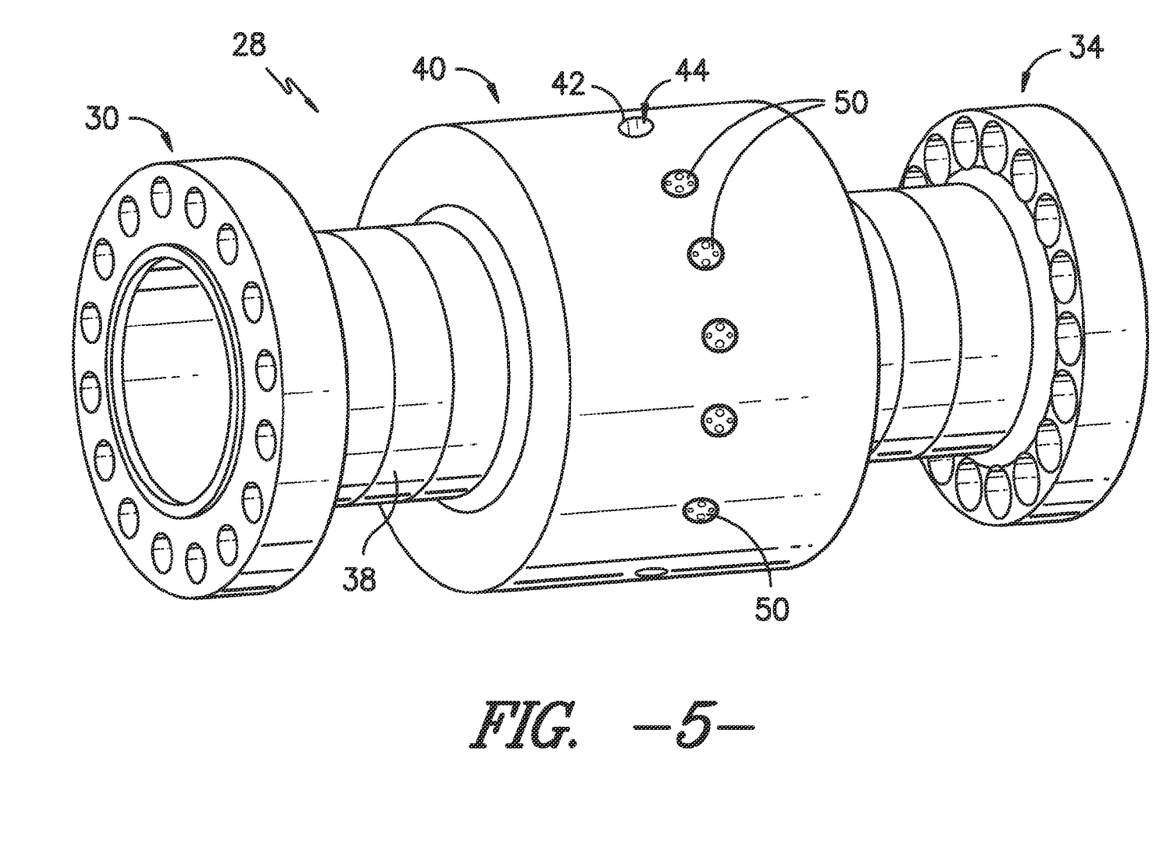
FIG. 5 is a perspective view of a load coupling in accordance with another embodiment of the present disclosure.

Referring now to FIGS. 3 through 5, load coupling 28 may further include a shaft 38 extending between the first flange 30 and second flange 34. Further, the load coupling 28 may include an annular ring 40 extending radially outward from one of the first flange 30, the second flange 34, or the shaft 38. The annular ring 40 may, for example, be integral with the one of the first flange 30, the second flange 34, or the shaft 38, or may be a separate component therefrom. The annular ring 40, by extending radially outward, may have a maximum diameter that is greater than the maximum diameter of the one of the first flange 30, the second flange 34, or the shaft 38 from which the annular ring extends.

FIG. 4 illustrates one embodiment of the annular ring 40, wherein the ring 40 extends from the first flange 30. FIG. 5 illustrates a second embodiment of the annular ring 40, wherein the ring 40 extends from the shaft 38 and is thus disposed between the first flange 30 and the second flange 34.

An annular ring 40 according to the present disclosure may include a plurality of bore holes 42 defined therein. The bore holes 42 may, for example, be defined in a generally annular array, as shown in FIGS. 4 and 5. FIG. 4 illustrates one embodiment of bore holes 42, wherein each bore hole 42 extends axially between a first opening 44 and a second opening 46. FIG. 5 illustrates a second embodiment of bore holes 42, wherein each bore hole 42 extends radially and defines a first opening 44.

As further illustrated in FIGS. 4 and 5, one or more first caps 50 may be provided and included on a load coupling 28 according to the present disclosure. A first cap 50 may be connected within one of the plurality of bore holes 42 proximate the first opening 44 of that bore hole 42. Further, as discussed herein, the first cap 50 may be deformable such that an interference fit is created with the bore hole 42 that the first cap 50 is disposed within.

Figure 7:
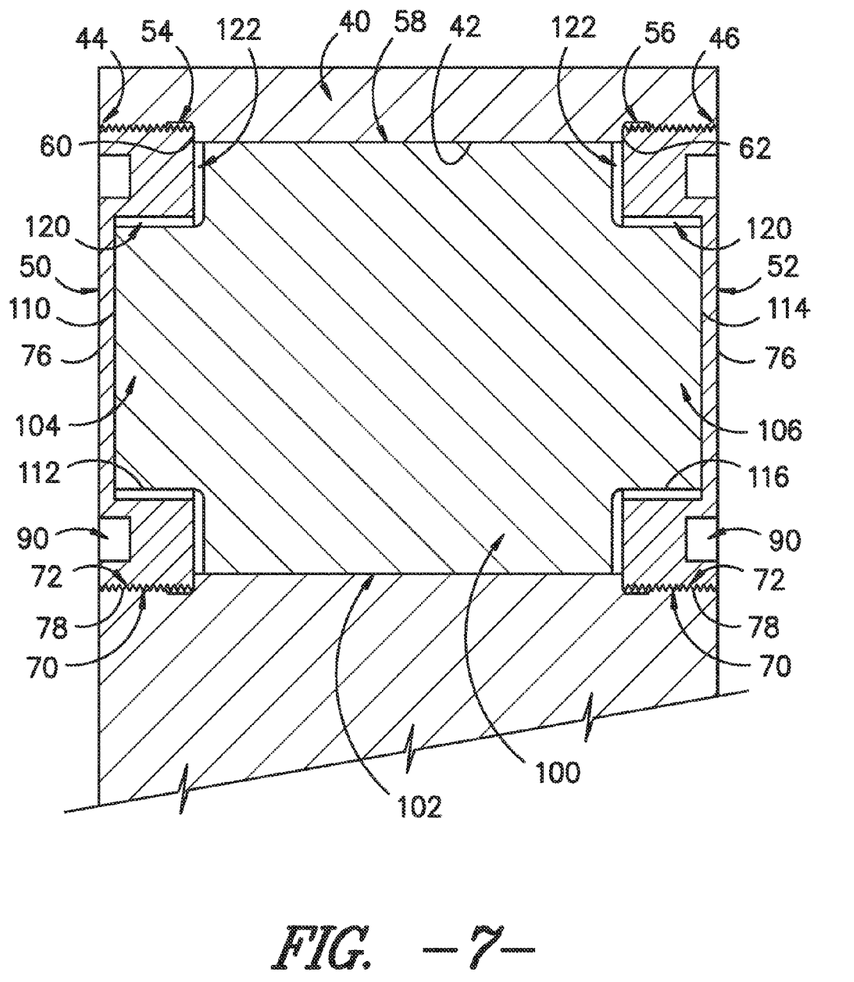
FIG. 7 is a cross-sectional view of a first cap, a second cap, and a plug installed in a bore hole of an annular ring in accordance with one embodiment of the present disclosure.

Referring now to FIG. 7, in embodiments wherein bore holes 42 include second openings 46, second caps 52 may additionally be provided and included on a load coupling 28 according to the present disclosure. A second cap 52 may be connected within one of the plurality of bore holes 42 proximate the second opening 46 of that bore hole 42. Further, as discussed herein, the second cap 52 may be deformable such that an interference fit is created with the bore hole 42 that the second cap 52 is disposed within.

It should be noted that, in some exemplary embodiments, first caps 50 and, if necessary, second caps 52, may be provided in all bore holes 42 of the annular ring 40. By installing caps 50, 52 in all bore holes 42, windage and noise during operation may be minimized. Alternatively, however, any suitable number of first caps 50 and/or second caps 52 may be utilized and provided in any suitable number of bore holes 42.

Referring now to FIGS. 6 through 9, first caps 50 and second caps 52 may be disposed and connected within bore holes 42 proximate first openings 44 and second openings 46, respectively. For example, a bore hole 42 may include a first counterbored portion 54 and a second counterbored portion 56. The first counterbored portion 54 may include the first opening 44 and the second counterbored portion 56 may include the second opening 46. These portions may have relatively larger maximum diameters than a central portion 58 of the bore hole 42, as shown. A first cap 50 and second cap 52 may be disposed and connected within a first counterbored portion 54 and a second counterbored portion 56, respectively. Further, when the caps 50, 52 are connected to the bore hole 42, as discussed herein, the caps 50, 52 may contact first lip 60 and second lip 62 of the first counterbored portion 54 and a second counterbored portion 56, respectively. As the caps 50, 52 contact and press against the lips 60, 62, this preloading force against the lips 60, 62 may advantageously increase the retention of the caps 50, 52 within the bole hole 42 and decrease the risk of either cap 50, 52 loosening during operation of the power train 26.

In exemplary embodiments, a cap 50, 52 may be connected within a bore hole 42 due to a threaded engagement therewith. Thus, for example, a cap 50, 52 may include a plurality of outer threads 70 (which may for example be a continuous thread wrapping helically about the cap 50, 52). These outer threads 70 may connect to inner threads 72 of the bore hole 42 to connect the cap 50, 52 within the bore hole 42. Alternatively, however, any suitable connection of a cap 50, 52 within a bore hole 42 is within the scope and spirit of the present disclosure.

As shown, a cap 50, 52 may include an outer surface 76 and a side surface 78. Outer threads 70, for example, may be defined in the side surface 78. When a cap 50, 52 is installed in a bore hole 42, outer surface 76 may be proximate an opening 44, 46 of the bore hole 42. For example, in some embodiments, outer surface 76 may be flush with the opening 44, 46 or slightly above or below the opening 44, 46 within the bore hole 42. Further, one or more channels 80 may be defined in the side surface 78. As shown, for example, a channel 80 may be defined in a portion of the side surface 78, extending peripherally through a portion of the side surface 78. In exemplary embodiments, two opposing channels 80 may be defined in a side surface 78. Each channel 80 may cause a tab 82 to be defined between the channel 80 and the outer surface 76 of a cap 50, 52.

Figure 8:
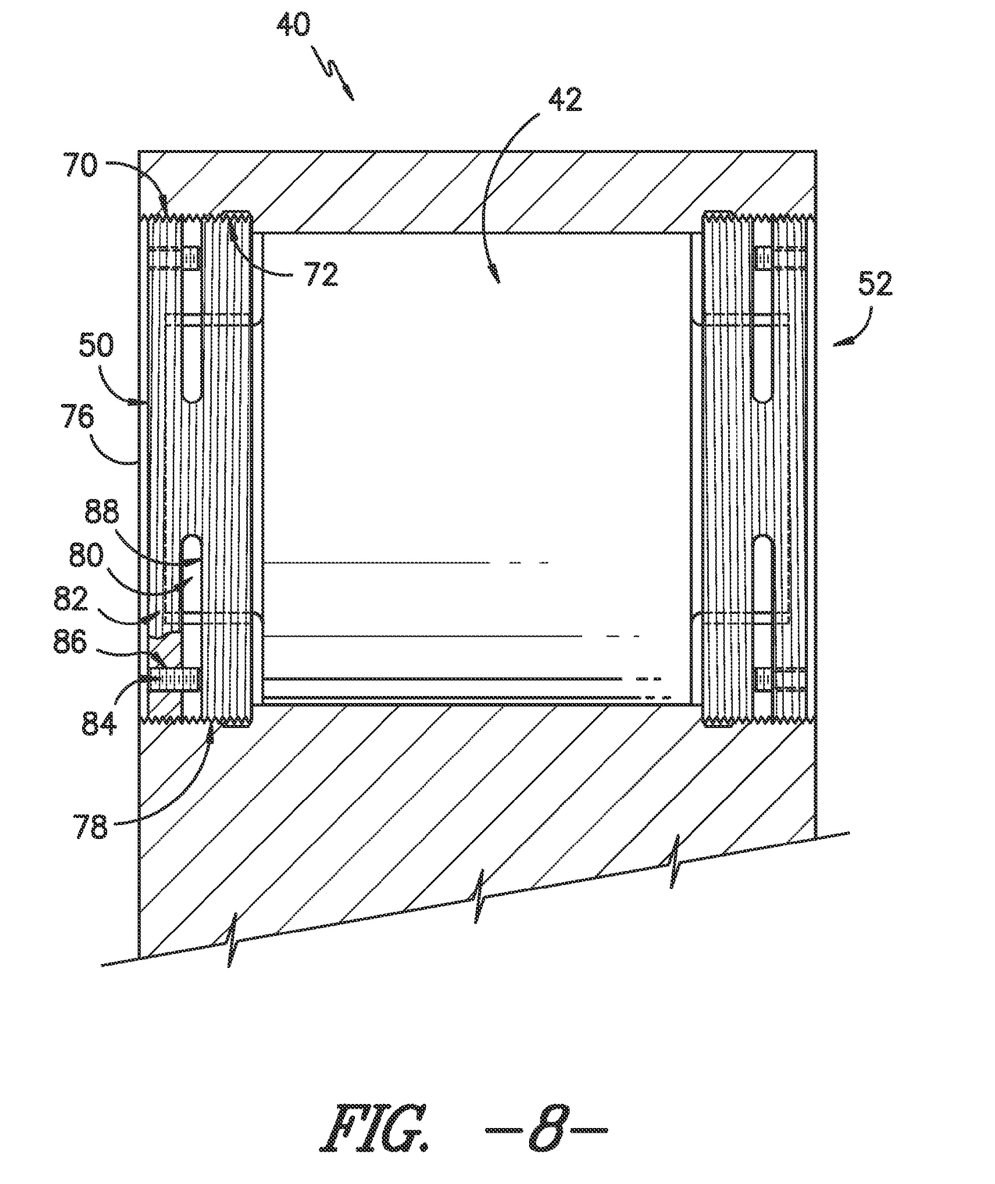
FIG. 8 is a cross-sectional view of a cap having tabs in non-deformed positions in accordance with one embodiment of the present disclosure.
Figure 9:
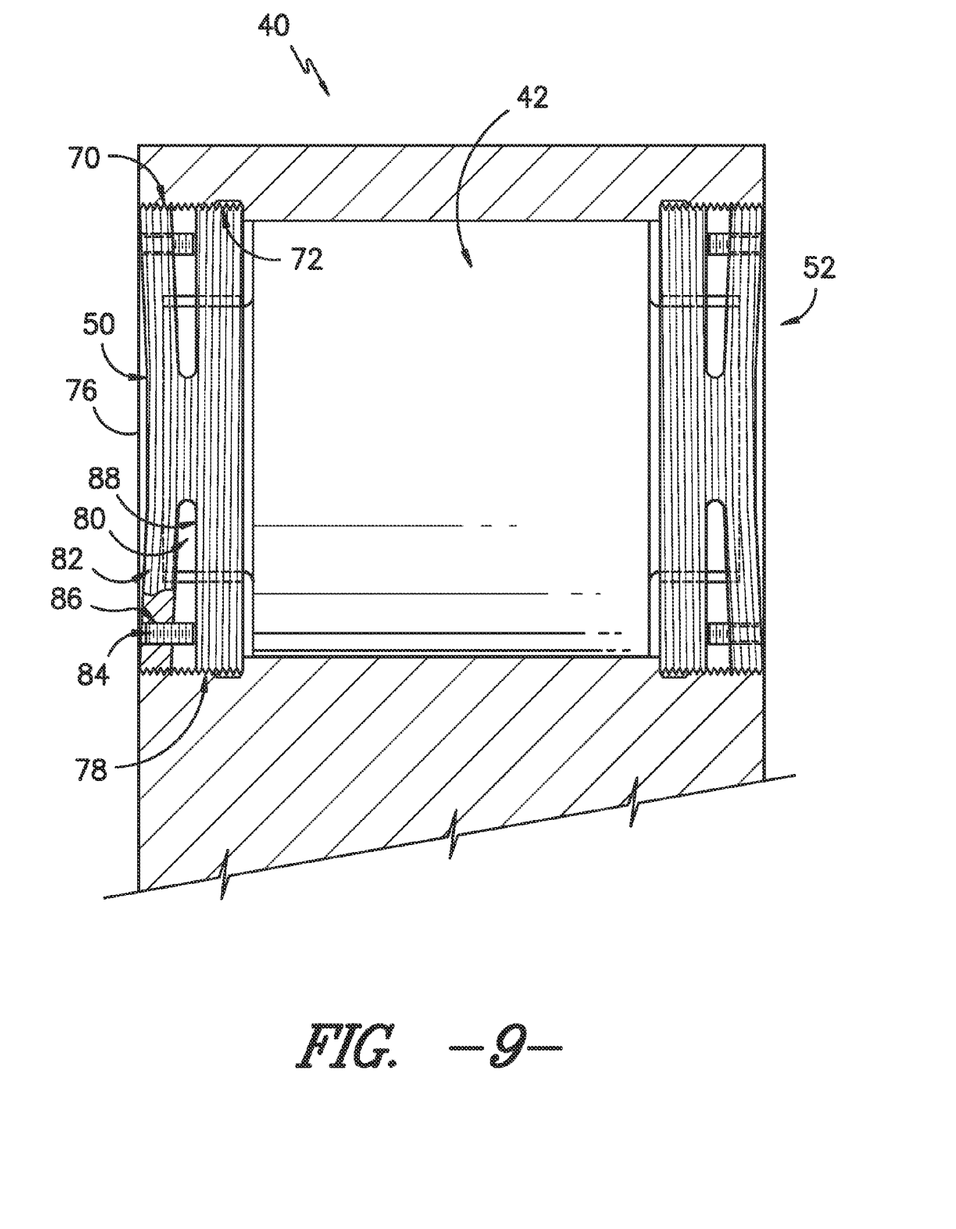
FIG. 9 is a cross-sectional view of a cap having tabs in deformed positions in accordance with one embodiment of the present disclosure.

Advantageously, as illustrated in FIGS. 8 and 9, tabs 82 may be deformable to create the interference fit between a cap 50, 52 and a bore hole 42. Such deformation may be permanent or temporary. By deforming a tab 82 of a cap 50, 52 to provide this interference fit, deformation of other, relatively permanent and more expensive components of the load coupling 28, such as the shaft 38, a flange 30, 34, or the annular ring 40 is advantageously avoided. Additionally, such deformation may, in embodiments wherein the caps 50, 52 include outer threads 70, change the pitch of these threads 70. This pitch modification may advantageously reduce the ability of the caps 50, 52 to rotate during operation.

FIG. 8 illustrates one embodiment of tabs 82 in non-deformed positions. FIG. 9 illustrates one embodiment of tabs 82 in deformed positions. In exemplary embodiments, for example, set screws 84 may be extended through a tab 82 to deform the tab 82. For example, screw holes 86 may be defined in the outer surface 76 and tabs 82 of a cap 50, 52. A set screw 84 may be extended through and placed in threadable connection with a screw hole 86, and the set screw 84 may then contact an inner surface 88 of the channel 80. After contact with the inner surface 88, continued extension of the set screw 84 through the screw hole 86 may bend the tab 82 outward, as illustrated in FIG. 9. This bending may cause an interference fit between the cap 50, 52 and the bore hole 42, such as between the outer threads 70 and inner threads 72 thereof.

It should be noted that additional holes or depressions 90 may be defined the outer surface 76 of a cap 50, 52. These holes or depressions 90 may be utilized to connect a cap 50, 52 within a bore hole 42. For example, in exemplary embodiments a spanner wrench or other suitable tool may be utilized to screw a cap 50, 52 into a bore hole 42. The tool may engage the holes or depressions 90 to facilitate such screwing or otherwise connecting.

Referring again to FIGS. 6 and 7, a plug 100 may be disposed within one or more bore holes 42. A plug 100 may be provided within a bore hole 42 spaced from openings 44, 46, such that caps 50, 52 generally cover the plug 100 and the plug 100 is, for example, disposed between caps 50, 52.

It should be noted that, in some exemplary embodiments, plugs 100 may be provided in pairs in opposing bore holes 42 of the annular ring 40, which may be for example approximately 180 degrees apart on the annular ring 40. Further, each pairs of plugs 100 in exemplary embodiments may be approximately equal in weight. Such placement and weighting of plugs 100 may prevent imbalances in the load coupling 28. Alternatively, however, any suitable number of plugs 100 having any suitable weighting may be utilized and provided in any suitable number of bore holes 42.

The use of plugs 100 in various bore holes 42 according to the present disclosure may advantageously adjust the mass, and thus inertia, of the load coupling 28. The shift in the inertia may change the natural frequencies of power train 26. A shift in the natural frequency may be intended to avoid the frequencies of torsional vibrations applied to or generated by the power train. The intended shift in the natural frequencies by adjusting the number of installed plugs 100 and the weight of the installed plugs 100 should result in a power train which does not experience excessive torsional vibration and has sufficient torsional frequency margin.

Plugs 100 may have various densities as desired or required to adjust the natural frequency of the power train 26. For example, in some exemplary embodiments, plugs 100 may be formed from tungsten, steel, aluminum, or titanium. Alternatively, however, any suitable materials are within the scope and spirit of the present disclosure. Further, it should be understood that plugs 100 utilized in a load coupling 28 according to the present disclosure may have generally identical or different densities, as desired or required.

Figure 6:
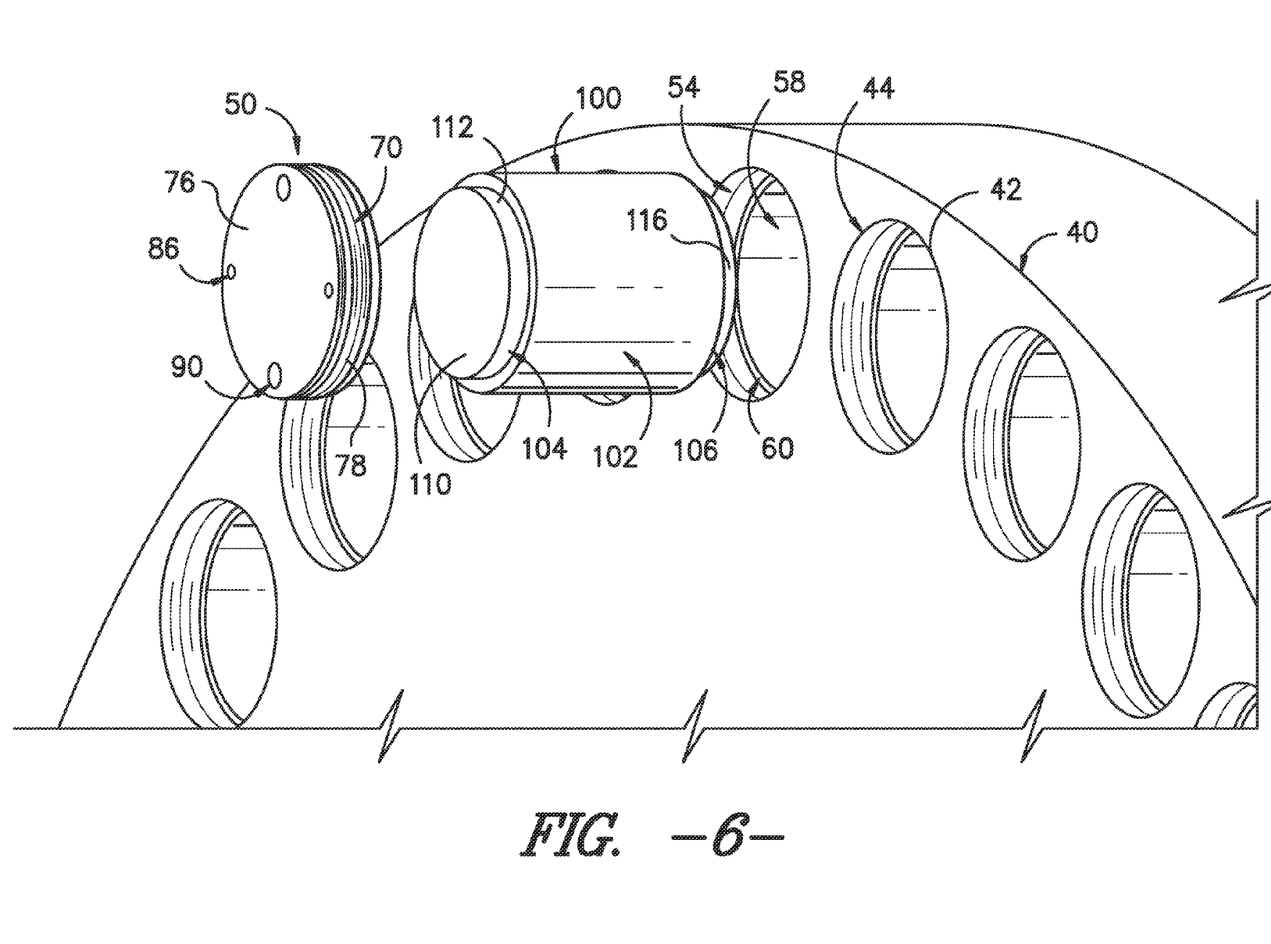
FIG. 6 is a perspective exploded view of an annular ring, a first cap, and a plug in accordance with one embodiment of the present disclosure.

When installed in a bore hole 42, a plug 100 in exemplary embodiments may contact an associated first cap 50 and/or second cap 52. As shown, for example, a plug 100 according to the present disclosure may include a main body 102. Further, a first projection 104 and/or second projection 106 may extend from ends of the main body 102. The first projection 104 may define a first end surface 110 of the plug 100, and may further define a side surface 112 of the first projection 104. The second projection 106 may define a second end surface 114 of the plug 100, and may further define a side surface 116 of the second projection 106.

The main body 102 may, in exemplary embodiments, be press or slide fit within the bore hole 42, such that the main body 102 is generally in contact with the bore hole 42, such as an inner surface thereof. For example, a clearance of between approximately 1 millimeter and approximately 10 millimeters, such as between approximately 1 millimeter and approximately 5 millimeters, such as between approximately 1 millimeter and approximately 3 millimeters, may be defined between the outer surface of the main body 102 and the inner surface of the bore hole 42.

Further, in exemplary embodiments, a plug 100 and caps 50, 52 may be disposed within a bore hole 42 such that portions of the first projection 104 and/or second projection 106 may contact the respective first cap 50 and/or second cap 52, while clearance gaps may be provided between other portions of the first projection 104 and/or second projection 106 and the respective first cap 50 and/or second cap 52. For example, the first end surface 110 may contact the first cap 50 and/or the second end surface 114 may contact the second cap 52. However, clearance gaps 120 may be provided between the first cap 50 and the side surface 112 and/or between the second cap 52 and the side surface 116. Further, clearance gaps 122 may be provided between the first cap 50 and the main body 102 and/or between the second cap 52 and the main body 102. Clearance gaps 120, 122 may be, for example, between approximately 30 millimeters and approximately 100 millimeters, such as between approximately 40 millimeters and approximately 80 millimeters, such as between approximately 45 millimeters and approximately 55 millimeters. The use of such clearance gaps may allow for preloading between the caps 50, 52 and plug 100, while reducing stresses in the caps 50, 52, the plug 100, and the load coupling 28 in general.

The present disclosure is further directed to methods for adjusting a torsional natural frequency of a power train 26 including a load coupling 28 coupled between a torque producing power source and a torque driven power load. A method may include, for example, providing an annular ring 40 extending radially outward from one of a first flange 30, a second flange 34, or a shaft 38 of the load coupling 28, as discussed herein. A method may further include, for example, connecting one or more first caps 50 within one or more bore holes 42 proximate first openings 44 thereof, the first caps 50 deformable such that interference fits are created with the bore holes 42, as discussed herein. A method may further include, for example, connecting one or more second caps 52 within one or more bore holes 42 proximate second openings 46 thereof, the second caps 52 deformable such that interference fits are created with the bore holes 42, as discussed herein. The method may further include inserting plugs 100 into the bore holes 42, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power train comprising:
    a torque producing power source including a rotating connecting flange;
    a torque driven power load including a rotating connecting flange; and
    a load coupling, the load coupling comprising:
        a first flange adapted to couple to the connecting flange of one of the torque producing power source and the torque driven power load;
        a second flange adapted to couple to the connecting flange of the other of the torque producing power source and the torque driven power load;
        a shaft extending between the first flange and the second flange;
        an annular ring extending radially outward from one of the first flange, the second flange, or the shaft, the annular ring comprising a plurality of bore holes defined therein, each of the plurality of bore holes comprising a first opening;
        a first cap connected within one of the plurality of bore holes proximate the first opening, the first cap comprising an outer surface and a side surface, wherein a channel is defined in the side surface of the first cap such that a tab is defined between the outer surface and the channel;
        a first fastener extending through the tab of the first cap, wherein extension of the first fastener through the tab of the first cap causes deformation of the tab of the first cap such that the interference fit is created with the one of the plurality of bore holes; and
        a plug disposed within the one of the plurality of bore holes, the plug comprising a main body and a first projection extending from the main body, the first projection defining a first end surface of the plug and a side surface, the plug and first cap disposed within the one of the plurality of bore holes such that the first end surface contacts the first cap and a clearance gap is provided between the first cap and the side surface and main body of the plug.

2. The power train of claim 1, wherein each of the plurality of bore holes extends axially between the first opening and a second opening, and further comprising:
    a second cap connected within the one of the plurality of bore holes proximate the second end, the second cap comprising an outer surface and a side surface, wherein a channel is defined in the side surface of the first cap such that a tab is defined between the outer surface and the channel; and
    a second fastener extending through the tab of the second cap, wherein extension of the second fastener through the tab of the second cap causes deformation of the tab of the second cap such that the interference fit is created with the one of the plurality of bore holes.

3. The power train of claim 1, wherein the plug is formed from one of tungsten, steel, aluminum, or titanium.

4. The power train of claim 1, wherein the first cap comprises a plurality of outer threads connectable to inner threads of the one of the plurality of bore holes.

5. The power train of claim 1, wherein the fastener is a set screw.

6. The power train of claim 1, wherein the annular ring extends radially outward from the first flange.

7. A load coupling for a power train, the load coupling comprising:
   a first flange;
   a second flange;
   a shaft extending between the first flange and the second flange;
   an annular ring extending radially outward from one of the first flange, the second flange, or the shaft, the annular ring comprising a plurality of bore holes defined therein, each of the plurality of bore holes comprising a first opening; and
   a first cap connected within one of the plurality of bore holes proximate the first opening, the first cap comprising an outer surface and a side surface, wherein a channel is defined in the side surface of the first cap such that a tab is defined between the outer surface and the channel;
   a first fastener extending through the tab of the first cap, wherein extension of the first fastener through the tab of the first cap causes deformation of the tab of the first cap such that the interference fit is created with the one of the plurality of bore holes; and
   a plug disposed within the one of the plurality of bore holes, the plug comprising a main body and a first projection extending from the main body, the first projection defining a first end surface of the plug and a side surface, the plug and first cap disposed within the one of the plurality of bore holes such that the first end surface contacts the first cap and a clearance gap is provided between the first cap and the side surface and main body of the plug.

8. The load coupling of claim 7, wherein each of the plurality of bore holes extends axially between the first opening and a second opening, and further comprising:
   a second cap connected within the one of the plurality of bore holes proximate the second end, the second cap comprising an outer surface and a side surface, wherein a channel is defined in the side surface of the first cap such that a tab defined between the outer surface and the channel; and
   a second fastener extending through the tab of the second cap, wherein extension of the second fastener through the tab of the second cap causes deformation of the tab of the second cap such that the interference fit is created with the one of the plurality of bore holes.

9. The load coupling of claim 8, wherein the plug is formed from one of tungsten, steel, aluminum, or titanium.

10. The load coupling of claim 7, wherein the first cap comprises a plurality of outer threads connectable to inner threads of the one of the plurality of bore holes.

11. The load coupling of claim 7, wherein the fastener is a set screw.

12. A method for adjusting a torsional natural frequency of a power train including a load coupling coupled between a torque producing power source and a torque driven power load, the method comprising:
   providing an annular ring extending radially outward from one of a first flange, a second flange, or a shaft of the load coupling, the annular ring comprising a plurality of bore holes defined therein, each of the plurality of bore holes comprising a first opening;
   connecting a first cap within one of the plurality of bore holes proximate the first opening, the first cap comprising an outer surface and side surface, wherein a channel is defined in the side surface of the first cap such that a tab is defined between the outer surface and the channel;
   inserting a first fastener through the tab of the first cap, wherein extension of the first fastener through the tab of the first cap causes deformation of the tab of the first can such that the interference fit is created with the one of the plurality of bore holes; and
   inserting a plug into the one of the plurality of bore holes, the plug comprising a main body and a first projection extending from the main body, the first projection defining a first end surface of the plug and a side surface, the plug and first cap disposed within the one of the plurality of bore holes such that the first end surface contacts the first cap and a clearance gap is provided between the first cap and the side surface and main body of the plug.

* * * * *